United States Patent [19]

Bishop et al.

[11] Patent Number: 4,539,898
[45] Date of Patent: Sep. 10, 1985

[54] SEMIAUTOMATIC FOOD FRYING APPARATUS

[75] Inventors: Charles D. Bishop, Dallas; Kenneth H. Stamps, Garland; David L. Turney, Dallas, all of Tex.

[73] Assignee: Alpaire, Inc., Garland, Tex.

[21] Appl. No.: 520,326

[22] Filed: Aug. 8, 1983

[51] Int. Cl.³ ............................................. A47J 37/12
[52] U.S. Cl. ...................................... 99/336; 99/337; 99/344; 99/407; 55/DIG. 36; 55/316; 165/DIG. 1; 169/65
[58] Field of Search ................. 99/403, 407, 410, 411, 99/413, 331, 409, 412, 333, 337, 336, 344; 236/1 A, 1 B, 1 H; 55/316, 387, DIG. 36; 221/150 R, 150 A, 150 HC; 126/391, 387, 365; 16/114 A, 114 R, 110 A; 165/110, 111, DIG. 1; 169/65

[56] References Cited

U.S. PATENT DOCUMENTS

| | | | |
|---|---|---|---|
| 1,649,387 | 11/1927 | Brosi | 16/114 A |
| 2,212,905 | 8/1940 | Tota | 99/403 X |
| 2,400,180 | 5/1946 | Venable | 55/316 X |
| 2,562,839 | 7/1951 | Winston | 55/316 |
| 2,753,436 | 7/1956 | Schwaneke | 99/403 X |
| 2,918,196 | 12/1959 | LeBron | 221/150 A X |
| 3,165,186 | 1/1965 | Zeiter | 221/150 HC X |
| 3,217,633 | 11/1965 | Anetsberger | 99/411 X |
| 3,443,633 | 5/1969 | Carnavos | 165/DIG. 1 X |
| 3,685,432 | 8/1972 | Hoeberigs | 99/407 X |
| 3,818,820 | 6/1974 | Harris et al. | 99/407 |

FOREIGN PATENT DOCUMENTS 92075 12/1921 Fed. Rep. of Germany ........ 99/331

Primary Examiner—Billy J. Wilhite
Attorney, Agent, or Firm—Kanz, Scherback & Timmons

[57] ABSTRACT

Semiautomatic food frying apparatus is disclosed which provides apparatus which may be easily and safely operated to prepare small portions of various food products. In one embodiment, the food frying apparatus includes an upright cabinet with a fan assembly mounted to exhaust air through the top of the cabinet while drawing air in, through and from the lower portion of the cabinet. A removable one-piece filter unit is positioned in the path of air flow to remove odors, gases, smoke, etc. . . . from the air before the air is exhausted back into the room. The removable filter includes a paper filter together with activated charcoal particles configured as an integral unit. In another embodiment, the fan assembly and filter unit are replaced by a closed-loop air cleaning system which does not discharge the internal air of the apparatus into the room. A container for holding a supply of cooking oil is located in the lower portion of the cabinet. Mechanism is provided for automatically lowering a cooking basket, with food therein, into the cooking oil for a predetermined time and then raising the cooking basket from the cooking oil.

36 Claims, 19 Drawing Figures

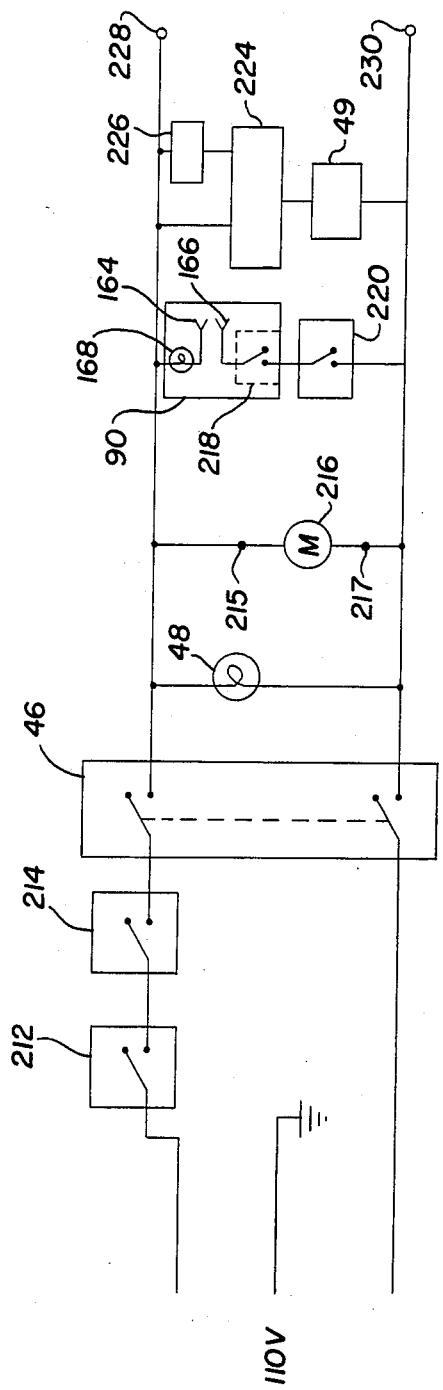
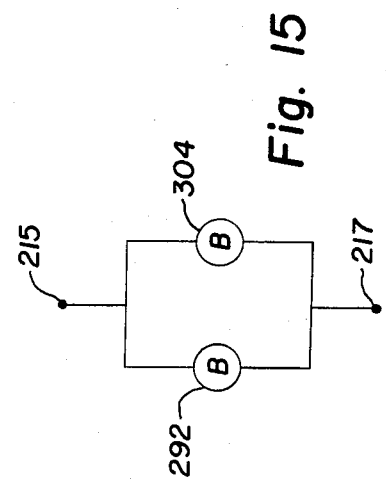
Fig. 11
Fig. 15

SEMIAUTOMATIC FOOD FRYING APPARATUS

BACKGROUND OF THE INVENTION

1. Field of the Invention p The present invention relates in general to food preparation. More particularly, this invention relates to apparatus for the deep-fat frying of food and specifically is directed to semiautomatic deep-fat frying apparatus for the frying of food in a retail environment while essentially eliminating the introduction of smoke and/or odor into the surrounding environment.

Although the present invention is applicable for deep-fat frying of numerous types of food products, it has been found to be particularly useful in the frying of frozen french-fry cut potato pieces or breaded-type snack foods in a bar or fast-food counter environment. Therefore, without limiting the applicability of the invention to "frying of frozen french-fry cut potato pieces", the invention will be described in this environment.

Deep-fat fryers or french fryers are widely used in the restaurant business for cooking various food products such as french-fried potatoes, fish and chicken. Typically, such french fryers comprise a deep tank containing a pool of cooking oil in the lower part of the tank with the cooking oil being heated by an immersed electric heating element or by gas flame. The uncooked food product is placed in a basket which is lowered into the heated oil for the desired cooking period. When the product is done, as determined by visual inspection by the restaurant employee or the sound of an audio timer, the basket should be removed from the oil by the employee and the product served to a customer or transferred to a holding station where it is kept warm by heat lamps until served.

With the advent of convenience stores, self-service stations which also handle convenience store items, etc., the need for apparatus to provide hot food products such as french-fried potatoes, fish and chicken has increased. Since there is normally only one employee for such businesses, the apparatus must be of the type which is easily and safely operated by the employee. The apparatus must also be reasonable in cost to the business proprietor, be reliable in its operation and not pollute the surrounding environment.

2. Description of the Prior Art

In the prior art, various machines are known for processing and dispensing small batches or individual servings of a food product, such as french-fried potatoes.

U.S. Pat. No. 3,667,373 discloses an automated coinoperated fried potato machine containing a removable multiple bin supply tray to hold a predetermined quantity of potatoes in each bin and a mechanism to feed the potatoes from successive bins to a hopper which empties into a basket positioned within a cooking bowl. The cooking bowl is pivotally mounted above a storage vessel containing hot cooking oil. An oil lift assembly supplies oil from the storage vessel to the cooking bowl for each batch of potatoes and after the potatoes are fried, the basket is pivoted to dump the fried potatoes into a serving tray fed from a supply stack. The cooking bowl is pivoted to dump the oil through a removable and replaceable filter member and into the storage vessel.

U.S. Pat. No. 3,818,820 discloses an automatic machine for preparing fried potato products which contains a food hopper for storing the potatoes to be fried. A slidably mounted ejection scoop at the bottom of the food hopper dispenses the right amount of potatoes into a basket immersed into a vat of cooking oil. At the end of a predetermined time, the basket is pivoted to drop the fried potatoes into a waiting container. The machine also contains a fan to extract the fumes via a replaceable charcoal filter unit. An automatic fire extinguisher unit is mounted near the fume outlet to extinguish the oil if it should catch fire.

U.S. Pat. No. 3,981,232 discloses a free standing fryer having a fat fryer located within the interior of a cabinet. The cabinet includes a roof section which houses a fan means for extracting air and fumes from the cabinet and forcing the same through filter means which includes charcoal. A fire extinguisher is also disclosed.

Graham (U.S. Pat. No. 3,971,307) discloses a deep fat fryer including a front-mounted control panel spanning the gap between two forwardly-extending arms of a generally H-shaped tubular frame which forms an opened-topped hinged lid for the fat reservoir. The H-shaped tubular frame is hinged at the rear portion thereof, opposite of the front-mounted control panel. A submersible heating element is attached to the front-mounted control panel and extends downwardly into the cooking oil. When the H-shaped tubular frame is raised upwardly, the heating element is raised out of the cooking oil and moves with the tubular frame.

The present invention as claimed is intended to provide a solution to various prior art deficiencies including the reliability problems associated with the complex automated mechanisms. Also the high initial cost of daily operation and mantenance. In addition, the unacceptable service requirements associated with the highly automated mechanisms. There is also the problem of air pollution by the odor and smoke emitted from some of the machines. Some machines also tend to allow small amounts of cooking oil to exit from the machine. Also, the relative large physical size of the automated units can limit the location of the mechanism as well as the need for an external exhaust. In some prior art devices which store the food, there is a risk of spoilage and contamination of the food. In some units, it is inconvenient and difficult to clean the parts in contact with the oil and oily foods because of the complex automated mechanisms. In addition, many machines are of a design which does not allow for fast and easy removal and replacment of parts and units.

SUMMARY OF THE INVENTION

The present invention provides food frying apparatus which may be easily and safely operated to prepare small portions of various food products. The apparatus is a small unit for placement on a counter top without a requirement for an exhaust duct external to the room or for special wiring supplying 220 volt service. Emphasis is placed on ease of use, ease of cleaning and ease of replacement of parts, if needed. The food frying apparatus includes an upright cabinet which is rectangular-shaped in side profile. In one embodiment, a fan assembly is mounted in the upper-most portion of the cabinet and exhausts air through the top of the cabinet while drawing air in, through and from the lower portion of the cabinet. In this embodiment, a removable filter unit is positioned in the path of air flow upstream from the fan assembly to remove odors, gases, smoke, etc. from the air before the air is exhausted back into the room.

The removable filter includes a paper filter together with activated charcoal particles configured as an integral unit. In a second embodiment, a unique closed-loop air cleaning system is provided to remove smoke, water vapors, gases, etc. from the air internal to the food frying apparatus and does not exhaust the internal air into the room.

A container for holding a supply of cooking oil is located in the lower portion of the cabinet and is positioned in an insulative shroud with a resulting decrease in BTU's required to operate the apparatus. The heater element is embedded in the bottom portion of the container and does not directly contact the cooking oil. A fire extinguisher is automatically activated in case of fire in the apparatus. Means are provided for supporting a cooking basket out of the oil when not being used for cooking. Safety means are provided for removing power to the unit when a fire occurs or when the air within the lower portion of the apparatus exceeds a predetermined temperature. Safety means are provided for removing power to the heater element when the cooking oil exceeds a predetermined temperature or when the container for the cooking oil exceeds a predetermined temperature. Means are provided for automatically lowering the cooking basket (containing the food) into the cooking oil for a predetermined time and then raising the cooking basket out of the cooking oil. Means are included in the apparatus to provide a signal when a predetermined cooking time has elapsed and/or the cooking basket is raised out of the oil.

Among the advantages offered by the present invention is the compactness, high reliability and safety features provided by the apparatus. The present invention allows the cooking to occur in an inside area without need for an external exhaust and without the need to provide special wiring, such as 220 volt. The present invention allows the simultaneous cooking of two separate batches of food. The present invention provides food frying apparatus which may be disassembled, without use of tools, for easy cleaning and replacement. The physical size of the invention is small so that it is capable of being placed in a large number of locations. Another advantage of the present invention is the low cost of daily operation of the apparatus.

Examples of the more important features of this invention have thus been summarized rather broadly in order that the detailed description thereof that follows may be better understood, and in order that the contribution to the art may be better appreciated. There are, of course, additional features of the invention that will be described hereinafter and which will also form the subject of the claims appended hereto. Other features of the present invention will become apparent with reference to the following detailed description of a presently preferred embodiment thereof in connection with the accompanying drawing, wherein like reference numerals have been applied to like elements, in which:

BRIEF DESCRIPTION OF THE DRAWING

FIG. 11 is a simplified schematic diagram of the electrical power and safety elements of the semiautomatic food frying apparatus, using a removable filter, according to the present invention;

FIG. 15 is a simplified schematic of the blower means for the closed-loop air cleaning system of the semiautomatic food frying apparatus according to the present invention;

DESCRIPTION OF THE PREFERRED EMBODIMENT

Figure 1:
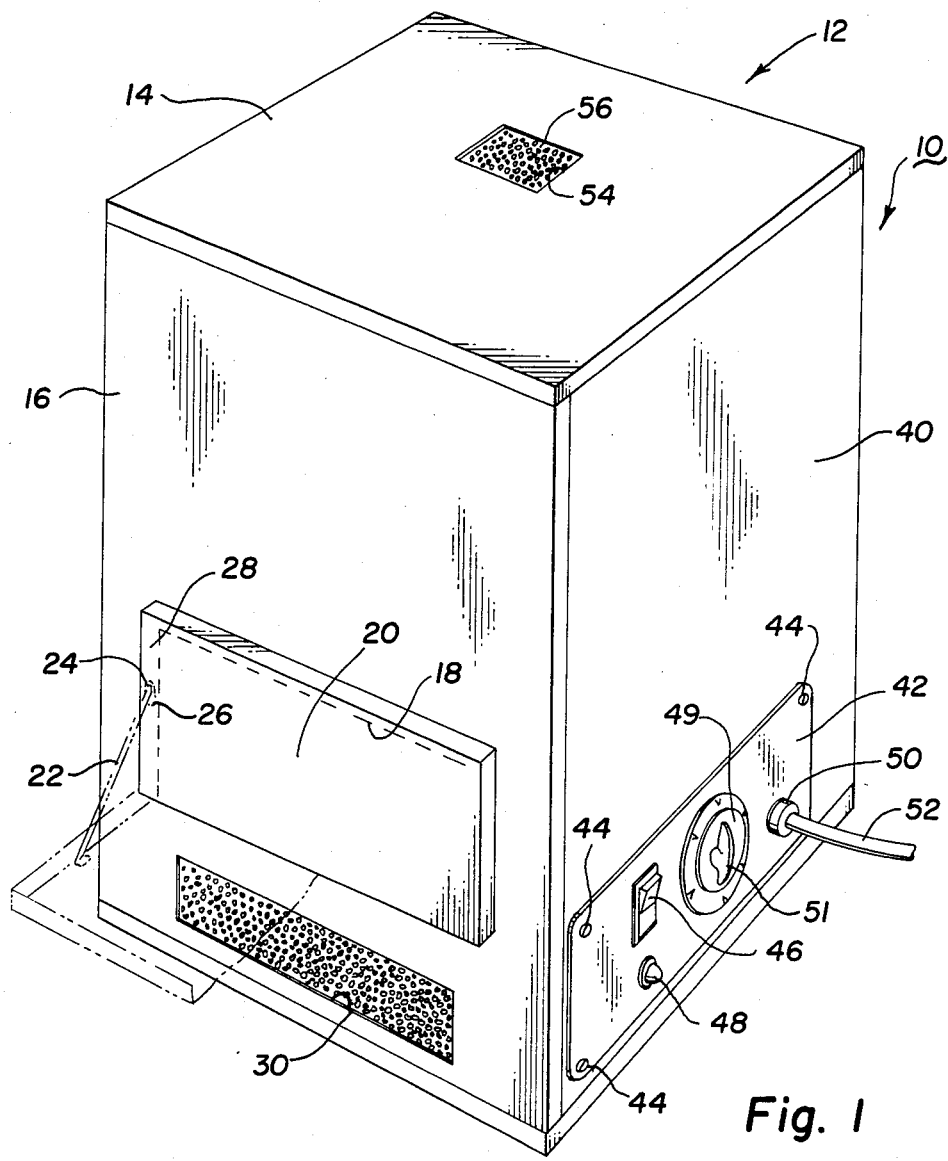
FIG. 1 is a simplified perspective view of the semiautomatic food frying apparatus according to the present invention.
Figure 2:
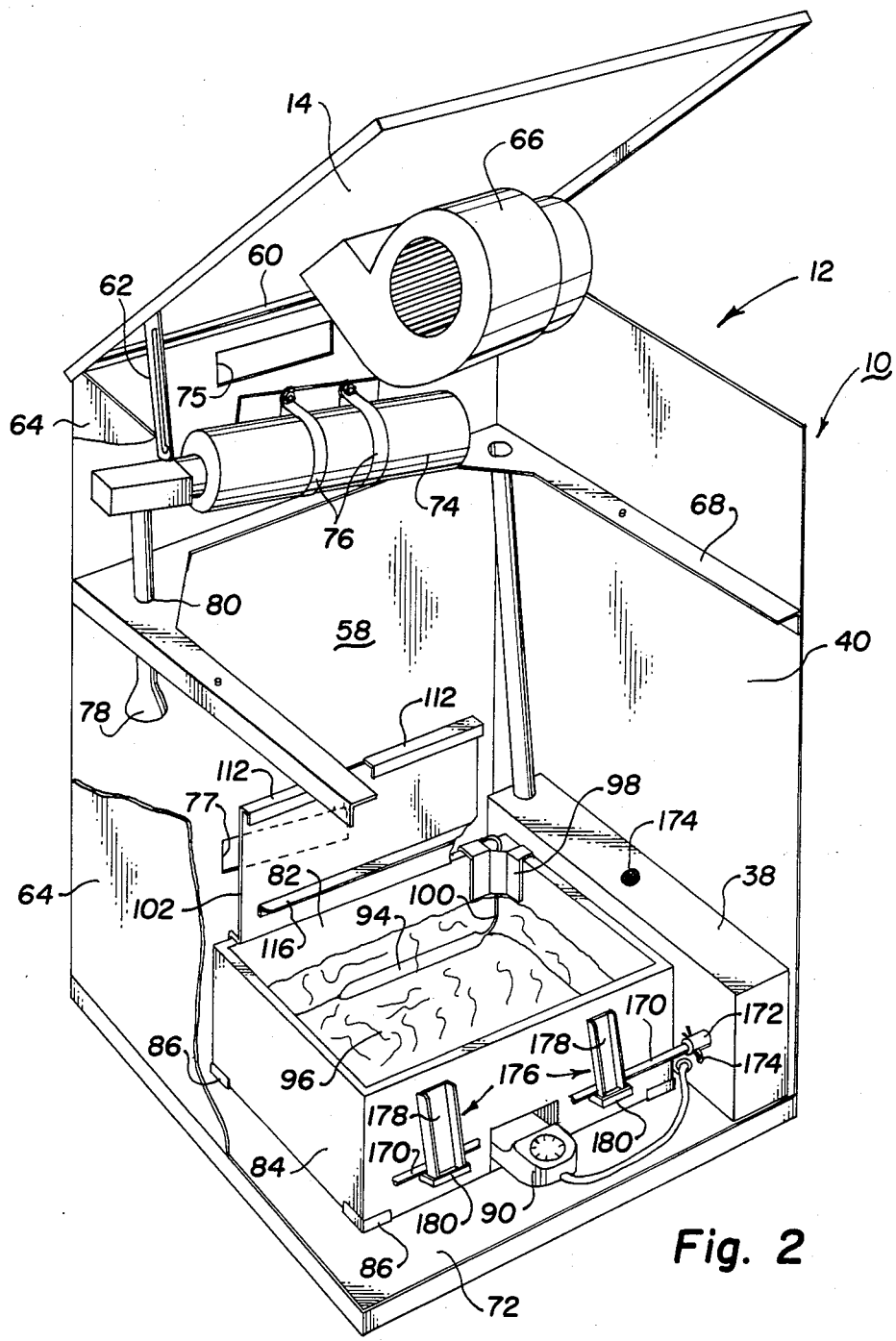
FIG. 2 is a simplified perspective view of the semiautomatic food frying apparatus according to the present invention with portions of the cabinet being displaced to expose apparatus to view.

Referring now to the drawing and in particular to FIGS. 1 and 2 semiautomatic food frying apparatus according to the present invention is generally referred to by reference numeral 10. The semiautomatic food frying apparatus 10 includes an upright cabinet 12 which is generally rectangular in shape in side profile. Access to the inside portions of upright cabinet 12 is provided by various means which includes a top cover portion 14, a removable front portion 16 and an opening 18 in the lower portion of front portion 16. Opening 18 is coverable by a pivotal tray or door 20 which is attached by hinge means (not shown) to front portion 16 such that tray or door 20 may pivot downwardly to a generally horizontal position as shown (partially) in phantom. Tray or door 20 is supported in the generally horizontal position by two support rods 22 (only one being shown), one support rod 22 being at each end of tray or door 20. The upper end of each support rod 22 is mounted for sliding movement through aperture 24 of support bracket 26 (only one being shown) with each support bracket 26 being mounted to the flange 28 defining opening 18. Positioned below opening 18 is an air inlet opening 30 covered by mesh or screen 32.

Control box 38 is held against the inside surface of side panel 40 by cover 42 and fasteners 44 and includes on/off switch 46, power indicator light 48, timer switch 49 and the input connector 50 for power cord 52.

Top cover portion 14 is pivotable upwardly and includes air outlet opening 54 covered by mesh or screen 56. Top cover portion 14 is pivotally attached to rear panel 58 by hinge means 60 and is supportable in the raised position by support bracket 62. Support bracket 62 is attached between top cover portion 14 and side panel 64. Fan assembly 66 is attached to the underside of the top cover portion 14 such that the exhaust opening of fan assembly 66 is aligned with air outlet opening 54.

Shelf 68 comprising angle-iron bracket material is located at a predetermined height above floor panel 72 and is attached to side panels 40 and 64 and rear panel 58. In the embodiment which uses a removable filter unit 70 (see FIG. 6) and exhausts the air from the semiautomatic food frying apparatus 10 back into the room, shelf 68 supports removable filter means 70 and essentially divides the semiautomatic food frying apparatus 10 into two basic areas. The first or upper area being one where the air contained in the semiautomatic food frying apparatus 10 is cleaned before it is exhausted to the surrounding air through air outlet opening 54. The second or lower area being the food preparation or frying area. Fire extinguisher 74 is attached to rear panel 58 by fastening means 76 and is located in the first or upper area with the head and sensor portion 78 extending through an aperture 80 into the second or lower area. When the head and sensor portion 78 senses a fire, the fire extinguisher 74 is automatically activated to extinguish the fire. In the embodiment which uses the closed-loop air cleaning system (to be discussed below) apertures 75 and 77 are formed in rear panel 58 in predetermined locations such as to be aligned with portions of the closed-loop air cleaning system. In the embodiment which uses the closed-loop air cleaning system, fan assembly 66 is not used and will be removed and air outlet opening 54 and air inlet opening 30 will be closed.

Container or vat 82 sits or fits down into holder or shroud 84 which sits on floor panel 72. Container or vat 82 comprises a material such as an aluminum alloy which readily conducts heat while holder or shroud 84 comprises a material such as a high temperature plastic or material which acts as an insulator and does not conduct heat. Holder or shroud 84 is held in place by tabs 86 with a tab 86 being located at each corner of holder or shroud 84 and being attached to floor panel 72. Aperture or cutout 88 is formed in one wall of holder or shroud 84 to allow the heater and temperature control unit 90 to operatively engage container or vat 82. Power and control cable 92 is operatively connected between circuitry in control box 38 and the heater and temperature control unit 90. Heat sensor 94 is positioned in container or vat 82 such that the heat sensor 94 is covered with cooking oil 96. Heat sensor 94 is held in position by clip or keeper 98 which attaches to the corner of container or vat 82 and holder or shroud 84 and holds the capillary tubing 100 in position against the wall of container or vat 82. Capillary tubing 100 is operatively connected between heat sensor 94 and circuitry within control box 38.

Figure 3:
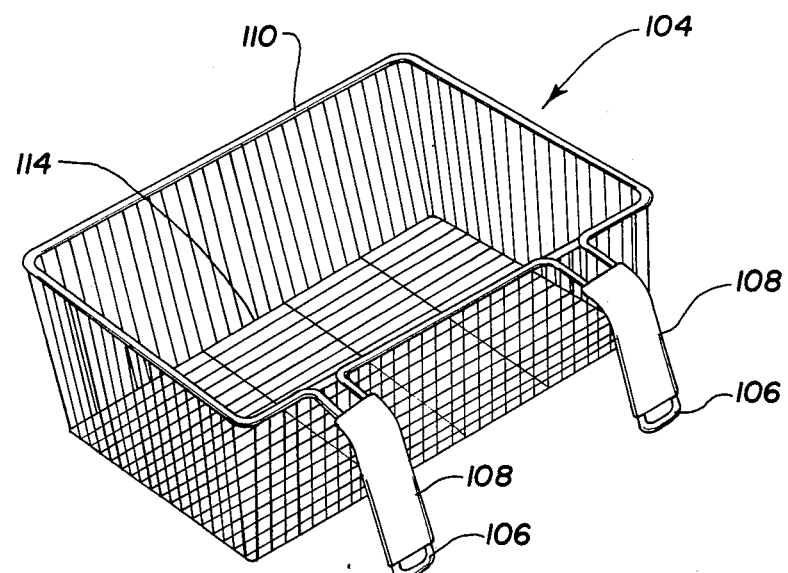
FIG. 3 is a simplified perspective view of a cooking basket of the semiautomatic food frying apparatus according to the present invention.

With reference to FIG. 3 cooking basket 104 is generally rectangular in shape and formed of predetermined lengths of wire. Handles 106, one embodiment, are formed as part of the wire forming the periphery of the open or top portion of the cooking basket 104. Cooking basket 104 is shaped to be placed or rested in the cooking oil 96 contained in container or vat 82. Insulation material 108 is formed around each handle 106 so the cooking basket 104 may be handled without the operator/employee's hand or hands being burned. It will be appreciated that cooking basket 104 could be essentially one-half the size shown in FIG. 3 such that two separate cooking baskets 104, with only one handle 106 on each cooking basket 104, could be used to prepare smaller portions of food, either simultaneously or at different times.

Figure 4:
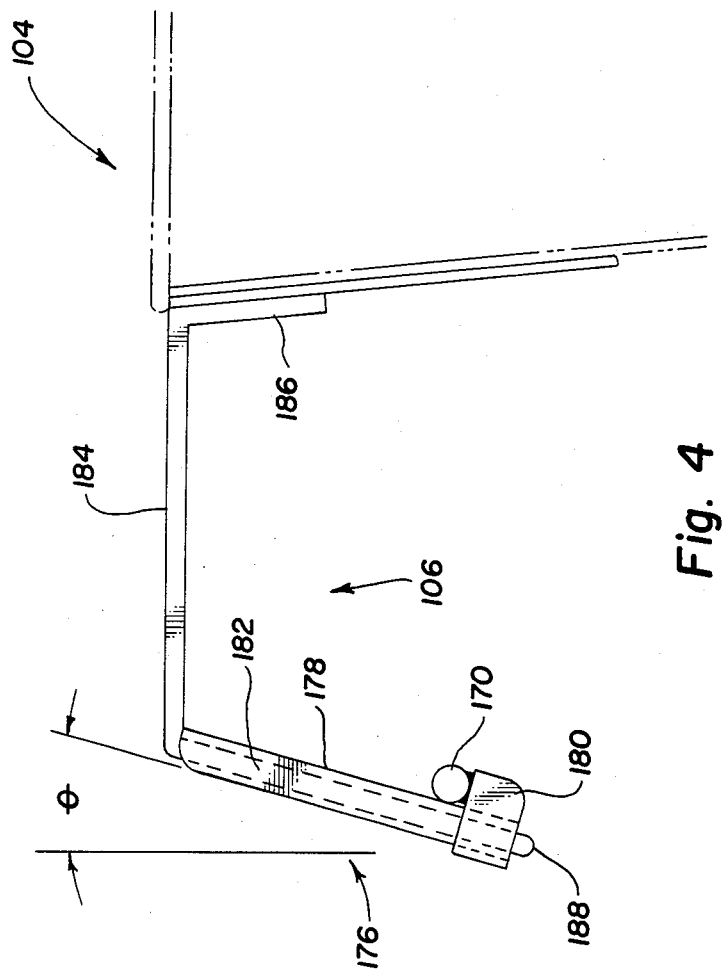
FIG. 4 is a simplified side elevational view of a handle guide and holder device used in conjunction with a cooking basket of the semiautomatic food frying apparatus according to the present invention.

With reference to FIGS. 2 and 4, the means for holding cooking basket 104 and automatically lowering the cooking basket 104 down into the cooking oil 96 for a predetemined time and then raising the cooking basket 104 out of the cooking oil 96 is disclosed. Shaft 170 is positioned across and near the front of holder or shroud 84 and is supported for rotational movement of fifteen to thirty degrees. One end of shaft 170 is inserted in coupler 172 and retained therein by fastening means 174. The opposite end of shaft 170 is supported by a bearing journal (not shown) attached either to floor panel 72 or side panel 64. Attached at predetermined locations along shaft 170 (by conventional means such as welding) are handle guides and holders 176 which include a handle guide and support portion 178 and a handle stop portion 180. For ease of explanation, the particular embodiment of handle 106 is shown as having three distinct sections: first section 182, second section 184 and third section 186. Shaft 170 and attached handle guides and holders 176 are shown in the position which places basket 104 down into the cooking oil 96. First section 182 is placed in the handle guide and support portion 178 (which comprises a U-shaped channel section) until end portion 188 of first section 182 protudes below handle stop portion 180. Handle stop portion 180 comprises a U-shaped portion with the open section being positioned under shaft 170. With reference to FIG. 4, cooking basket 104 produces a clockwise torque with respect to handle guides and holders 176 which is offset by handle stop portion 180 (which prevents end portion 188 from rotating clockwise) and handle guide and support portion 178 (which prevents first section 182 from moving or rotating clockwise). The cooking basket 104 is positioned by and follows the rotational movement of shaft 170. When the cooking basket 104 is positioned down into the cooking oil 96, as shown in FIG. 4, θ is approximately 15 to 20 degrees and represents the approximate angle from the vertical of first section 182.

To remove the weight of the cooking basket 104 and the food contained therein (when the semiautomatic means for lowering and raising the cooking basket is not being used) the cooking basket 104 may be supported out of the cooking oil 96 by the basket hanger or holder 102 by placing the upper-forward edge 110 of cooking basket 104 up into the turned-over edge portion 112 (an inverted U in shape) of the basket hanger or holder 102 and resting the lower-forward edge 114 of cooking basket 104 on shelf or ledge portion 116.

Figure 5A:
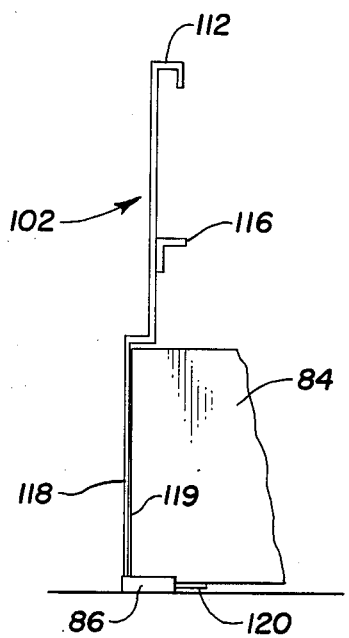
FIGS. 5A and 5B are simplified side elevational views of a basket hanger or holder of the semiautomatic food frying apparatus according to the present invention.
Figure 5B:
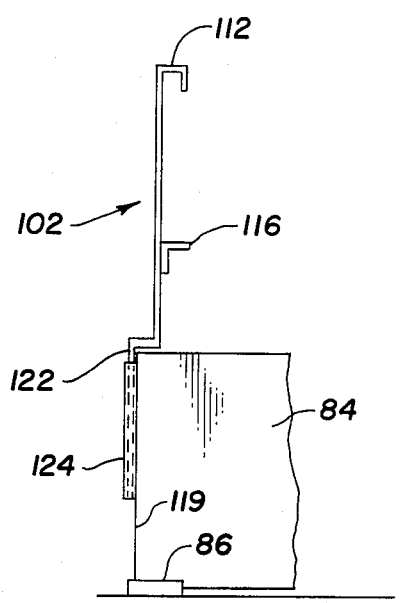

With reference to FIGS. 5A and 5B, the basket hanger or holder 102 is removably attached to holder or shroud 84 in one of the two ways. In FIG. 5A, the basket hanger or holder 102 includes a lower portion 118, below shelf or ledge portion 116, which is formed into a C-shaped section of such dimensions that it clamps to the rear wall 119 of holder or shroud 84. A foot portion 120 (which extends from lower portion 118) of basket hanger or holder 102 extends beneath holder or shroud 84. In FIG. 5B, basket hanger or holder 102 includes a straight lower portion 122 which is inserted in sleeve or pocket 124. sleeve or pocket 124 is formed as an integral part of the rear wall 119 of holder or shroud 84 or comprises a separate structure which is attached to the rear wall 119 by conventional means.

Figure 6:
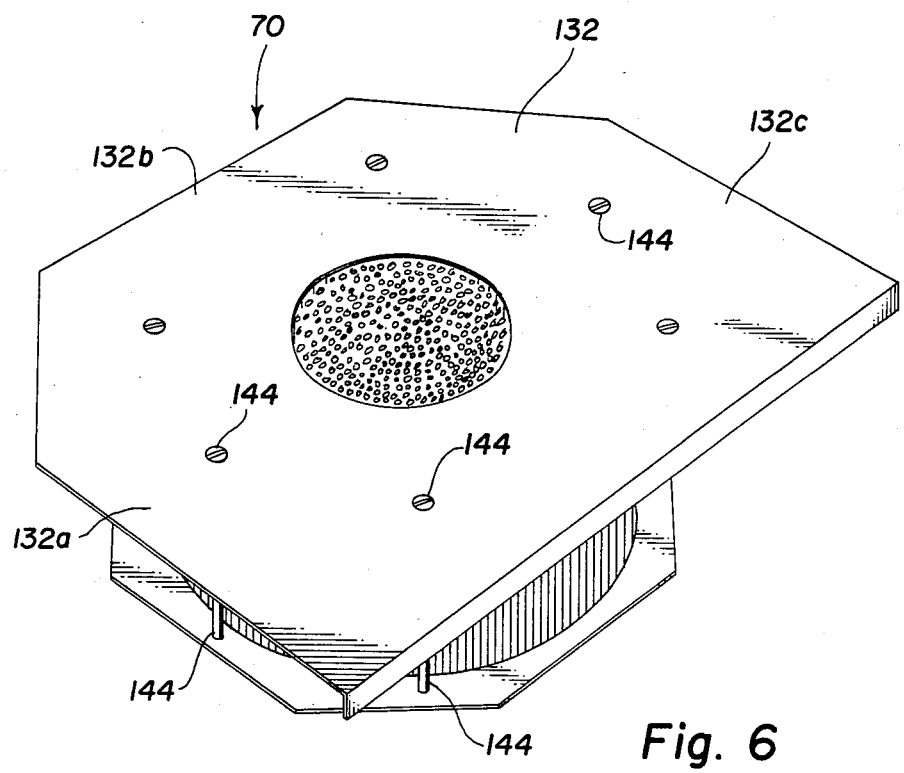
FIG. 6 is a simplified prespective view of the filter according to the present invention.

With reference to FIG. 6, the removable filter unit 70 is disclosed. The removable filter unit 70 comprises a one-piece unit which (in the embodiment in which it is employed) rests on and is supported by shelf 68. The outer edges 132a, 132b and 132c rest on shelf 68 with turned-down edge 133 being pressed against or touching the inside surface of front portion 16 of upright cabinet 12.

Figure 7:
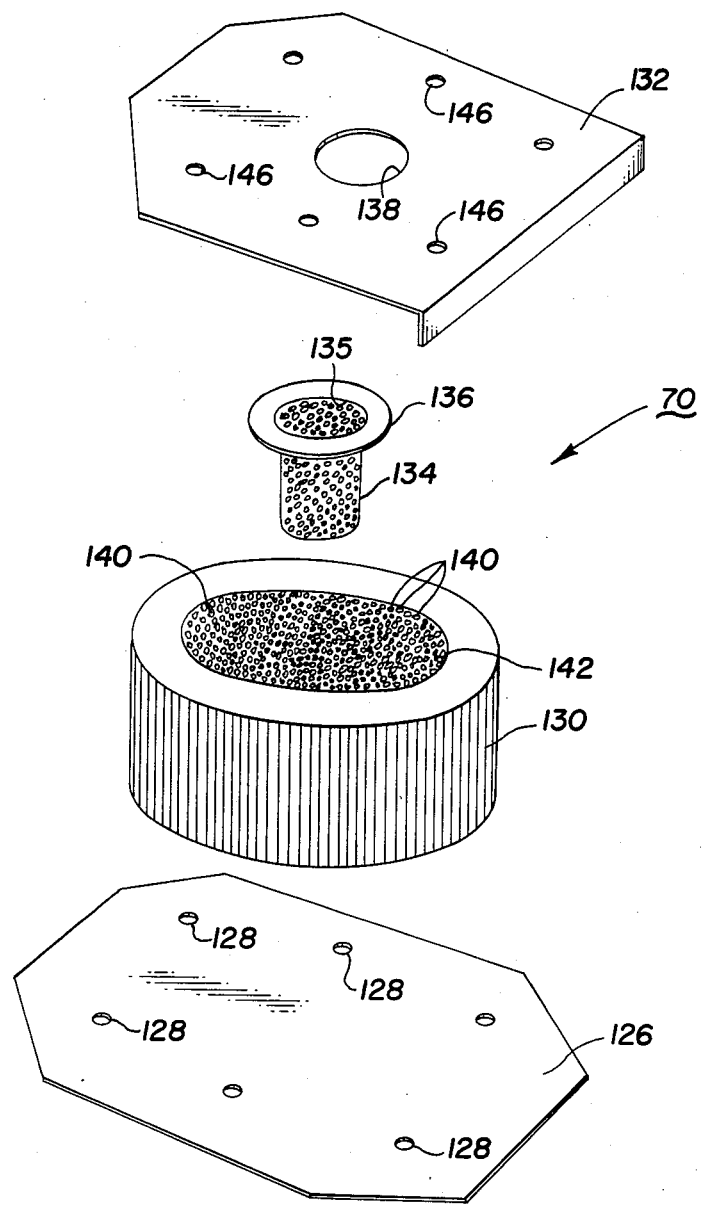
FIG. 7 is a simplified exploded view of the filter according to the present invention.

With reference to FIG. 7, filter means 70 comprises a solid floor portion 126 with apertures 128 formed therein at predetermined locations. A pleated paper filter element 130, cyclindrical in shape, is positioned between the solid floor portion 126 and a flat top portion 132. A cylindrical screen 134 is positioned between the solid floor portion 126 and the flat top portion 132 and coaxial with the pleated paper filter element 130 and the aperture 138 formed in the central area of flat top portion 132. Flange 136 may be attached to one end of cylindrical screen 134 so a large area will be present for flat top portion 132 to rest against or flange 136 may be used to attach cylindrical screen 134 to flat top portion 132 by conventional means. Activated charcoal particles 140 are placed in and fill the volume formed and defined by floor portion 126, aperture 142 of pleated paper filter element 130, flat top portion 132 and cylindrical screen 134. Fastening means 144 (see FIG. 6) are passed through apertures 128 of floor portion 126 and apertures 146, which are in alignment with apertures 128, to hold the elements comprising filter means 70 together as a removable unit which rests on shelf 68. The filter means 70 may be easily and readily replaced and the pleated paper filter element 130 and the activated charcoal particles 140 are easily replaced in the filter means 70 when they become dirty or clogged.

Figure 8:
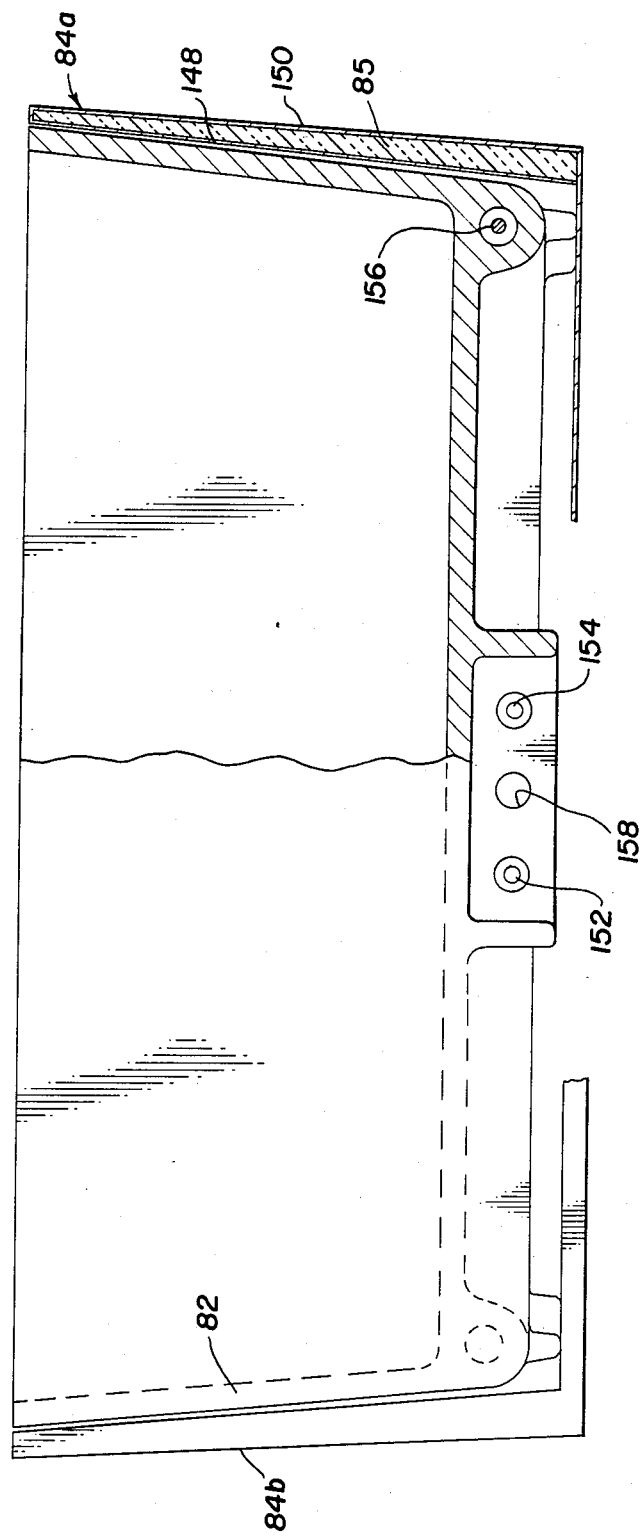
FIG. 8 is a simplified side elevational view of a container or vat, partially in section, and its relationship to the holder or shroud according to the present invention.

With reference to FIG. 8, container or vat 82 (partially in section) is shown with two different embodiments of holder or shroud 84. Holder or shroud 84a comprises 16 gauge stainless steel with the stainless steel folded over to provide a chamber between the inside wall 148 and the outside wall 150 which is filled with insulating material 85. Holder or shroud 84b comprises a high temperature plastic. Terminals 152 and 154 are connected to the ends of heater unit 156 which is formed within the body of container or vat 82. Aperture 158 provides means for insertion of a temperature probe 160 (see FIG. 9) used to monitor the temperature of the container or vat 82.

Figure 9:
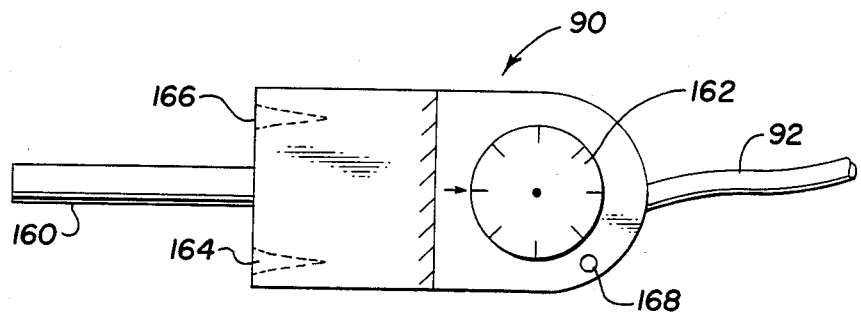
FIG. 9 is a simplified top plan view of the heater and temperature control unit of the present invention.

With reference to FIG. 9, the heater and temperature control unit 90 is shown and includes temperature probe 160 and temperature setting means 162. Terminals 164 and 166 operatively contact terminals 152 and 154 in container or vat 82 to allow power to be applied to the heater unit 156 in container or vat 82. Indicator light 168 provides an indication of when power is being applied to heater unit 156.

Figure 10:
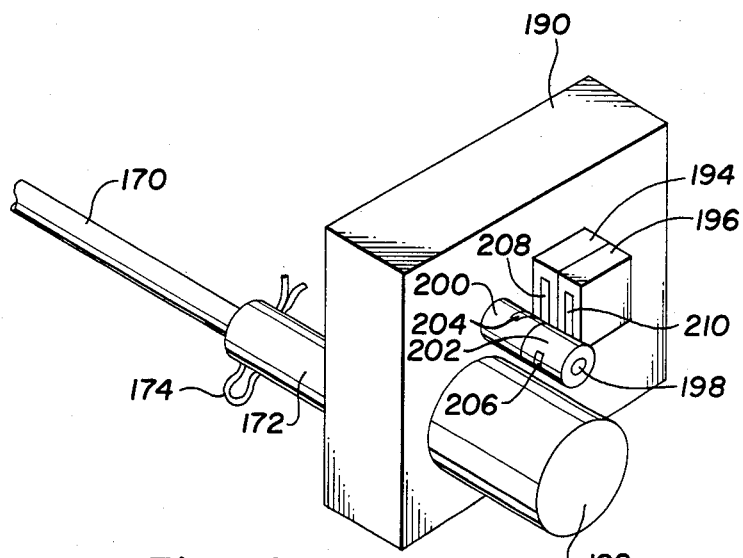
FIG. 10 is a simplified perspective view of the mechanism to automatically lower and raise the cooking basket of the semiautomatic food frying apparatus according to the present invention.

With reference to FIG. 10, means for rotating shaft 170 and automatically lowering the cooking basket 104 (containing the food) into the cooking oil 96 for a predetemined time and then raising the cooking basket 104 out of the cooking oil 96 is disclosed and comprises gear box 190 containing a predetermined number of reduction gears (not shown) operatively connected between a reversible DC motor 192 and coupler 172. The reversible DC motor 192 is attached to the side of gear box 190, as are two microswitches 194 and 196. Protruding through the wall of gear box 190 and operatively positioned with respect to microswitches 194 and 196 is rotatable shaft 198 which is driven by the reduction gears in gear box 190. Mounted on rotatable shaft 198 to rotate therewith are sleeves 200 and 202. Sleeves 200 and 202 include cutouts or depressions 204 and 206 respectively. The depression and release of switch reeds or levers 208 and 210 by sleeves 200 and 202 and cutouts or depressions 204 and 206 result in microswitches 194 and 196 being activated and/or inactivated. Microswitches 194 and 196 control the polarity of the DC drive voltage applied to the reversible DC motor 192 to determine the direction of rotation thereof. The electrical operation will be explained below.

With reference to FIG. 11, the electrical portion of the semiautomatic food frying apparatus 10 for activating various elements and for removing power for safety reasons under predetermined conditions is shown. Switch means 212 is associated with the fire extinguisher 74 and is normally closed. Switch means 212 is opened when the head and sensor portion 78 senses a fire in the semiautomatic food frying apparatus 10 and power is removed from the apparatus. Switch means 214 is associated with air temperature sensor 174 (see FIG. 2) and is normally closed. Switch means 214 is opened when the internal air temperature of the semiautomatic food frying apparatus 10 exceeds a predetermined temperature and power is removed from the apparatus. On/off switch 46 provides the manual means for applying power to or removing power from the semiautomatic food frying apparatus 10. Power indicator light 48 lets the operator know when power is applied to the semiautomatic food frying apparatus 10. Motor 216 is in fan assembly 66. Switch means 218 is associated with temperature probe 160 and temperature setting means 162 and is normally closed. When the temperature of container or vat 82 just meets or exceeds the temperature set by the operator on temperature setting means 162, switch means 218 will open to remove the power to heater unit 156. When the temperature of container or vat 82 drops to a predetermined amount below the value set on temperature setting means 162, switch means 218 will close to apply power to heater unit 156, etc. Switch means 220 is associated with heat sensor 94 positioned in the cooking oil 96 to sense the temperature of the oil. Switch means 220 is normally closed but will open to remove power from heater unit 156 if the temperature of the cooking oil 96 exceeds a predetermined temperature. If the cooking oil 96 becomes too hot, a fire could result. Timer switch 49 is operatively connected to timer circuitry 224 and buzzer 226; their operation will be discussed below.

Figure 12:
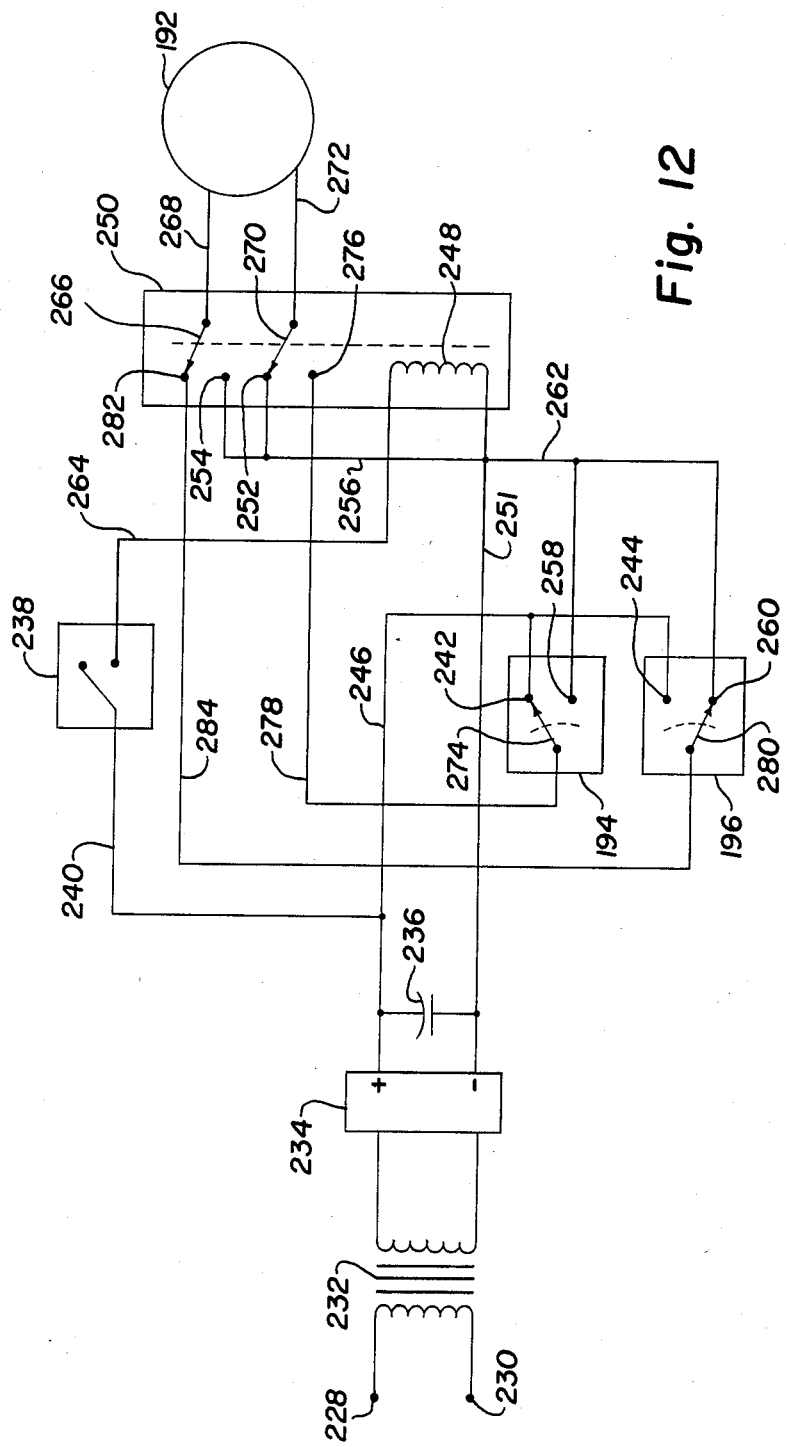
FIG. 12 is a simplified schematic diagram of the electrical portion of the mechanism to automatically lower and raise the cooking basket of the semiautomatic food frying apparatus according to the present invention.

With reference to FIG. 12, the electrical portion of the mechanism to automatically lower and raise the cooking basket of the semiautomatic food frying apparatus 10 is shown. Input voltage of 110 volts is applied to the primary of transformer 232 via terminals 228 and 230 of FIG. 11. The output (approximately 14 volts AC) of transformer 232 is applied to a full-wave bridge rectifier 234 whose DC output is applied across filter capacitor 236. The positive output of full-wave bridge rectifier 234 is applied to switch means 238 via lead 240, to terminal 242 of microswitch 194 and to terminal 244 of microswitch 196 via lead 246. The negative output of full-wave bridge rectifier 234 is applied to one side of coil 248 of relay switch 250 via lead 251 to terminals 252 and 254 of relay switch 250 via lead 256 and to terminal 258 of microswitch 194 and terminal 260 of microswitch 196 via lead 262. The other side of coil 248 is tied to switch means 238 via lead 264. Reversible DC motor 192 is tied to wiper 266 of relay switch 250 via lead 268 and to wiper 270 via lead 272. Wiper 274 of microswitch 194 is tied to terminal 276 of relay switch 250 via lead 278. Wiper 280 of microswitch 196 is tied to terminal 282 of relay switch 250 via lead 284.

The semiautomatic food frying apparatus 10 is a small compact unit which can easily be placed on a counter top in a convenience store or a bar establishment. The food frying apparatus can be plugged into any convenient outlet since it operates from 110 volt and does not require 220 volts. At the start of the business period, an employee would check the level of the cooking oil 96 in container or vat 82 and add cooking oil 96 if any was needed. With reference to FIGS. 1, 2, 11 and 12, the on/off switch 46 would be placed in the "on" position which would apply power to heater unit 156, motor 216 in fan assembly 66, power indicator light 48 and indicator light 168 in the heater and temperature control unit 90. Fan assembly 66 would draw air into the second or lower area of the semiautomatic food frying apparatus 10 through air inlet opening 30. The air would then be drawn through the pleated paper filter element 130, then through the activated charcoal particles 140, then through cylindrical screen 134 and out aperture 135 into the first or upper area of the semiautomatic food frying apparatus 10. Filter means 70 removes the smoke particulates, fumes and odors from the cooking oil 96, food etc . . . from the air before the air is discharged backed into the room. From the first or upper area of the semiautomatic food frying apparatus 10, the air is discharged back into the room through air outlet opening 54 by fan assembly 66. When indicator light 168 was cycled off indicating the cooking oil 96 had reached the desired temperature, then the semiautomatic food frying apparatus 10 would be ready to fry food. The operator would place the food to be fried in the cooking basket 104 (either the small or the large double size), open tray or door 20, place the cooking basket 104 into the interior of upright cabient 12 and position the handle or handles 106 into the handle guides and holders 176 and close tray or door 20. Cooking basket 104 is being held out of the cooking oil 96. The employee would turn the timer knob 51 to the desired time of cooking (which is usually less than five minutes) which closes switch means 238 and energizes coil 248. Wiper 266 is pulled down to contact terminal 254 and connects the negative terminal of the full-wave bridge rectifier 234 to lead 268 of reversible DC motor 192. Wiper 270 is pulled down to contact terminal 276 and connects the positive terminal of the full-wave bridge rectifier 234 through terminal 242 and wiper 274 of microswitch 194 to lead 272 of reversible DC motor 192. Reversible DC motor 192 will now start to rotate in a desired first direction to cause cooking basket 104 to be lowered into the cooking oil 96. When the reversible DC motor 192 starts to rotate, so do sleeves 200 and 202 and cutout or depression 206 moves, causing switch read or level 210 to be depressed by the surface of sleeve 202 and therefore moving wiper 280 from terminal 260 to terminal 244 resulting in terminal 282 being connected to the positive output of the full-wave bridge rectifier 234. The reversible DC motor 192 continues to run until depression 204 allows switch reed or lever 208 to be removed from the surface of sleeve 200 which moves wiper 274 from terminal 242 to terminal 258 which connects terminal 276 to the negative output of the full-wave bridge rectifier 234 and stops the reversible DC motor 192. When the timer switch 49 times-out, then switch means 238 opens and de-energizes coil 248. Wiper 266 goes up to and contacts terminal 282 and wiper 270 goes up to and contacts terminal 252. Lead 268 now has a positive voltage applied to it and lead 272 has a negative voltage applied to it, so the reversible DC motor 192 is energized to run in a second and opposite direction and cooking basket is lifted from the cooking oil 96. When cutout or depression 206 is positioned to allow switch reed or lever 210 to be removed from the surface of sleeve 202, wiper 280 is moved from terminal 260 to terminal 244 and the reversible DC motor 192 is stopped. Cooking basket 104 is out of the cooking oil 96 and buzzer 226 is activated to notify the employee that the food is ready. If the employee is busy at that movement, the food will remain hot since it is positioned over the hot cooking oil 96. If the small cooking basket 104 was used, the employee could remove the cooking basket 104 from the handle guide and holder 176 and place the cooking basket 104 on the basket hanger or holder 102 and cook another or different serving of food in another small cooking basket 104. Sleeves 200 and 202 are adjustable in a rotational position with respect to rotatable shaft 198 so both the upper limit position and the lower limit position of cooking basket 104 may be adjusted independently of each other.

Figure 13:
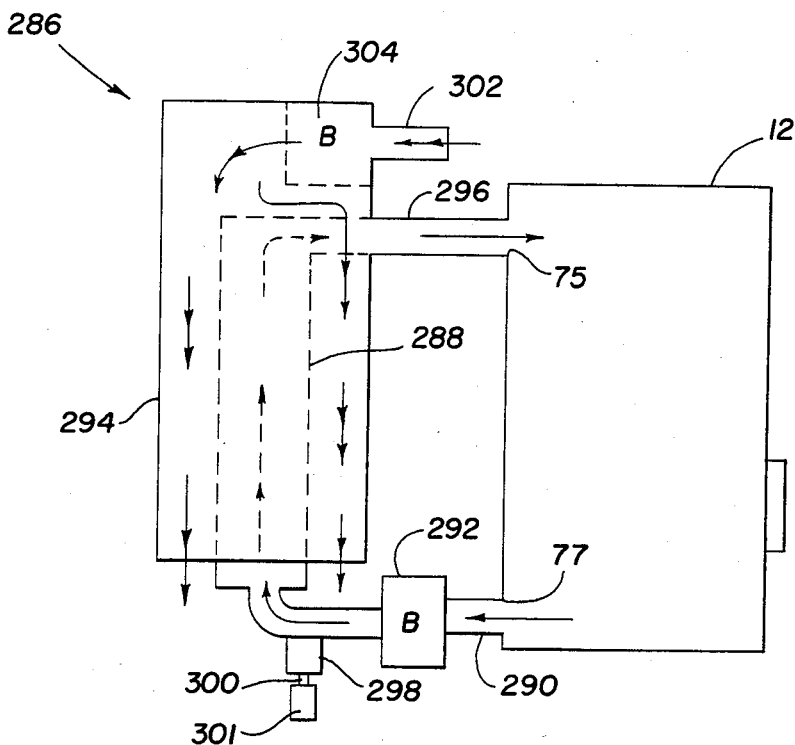
FIG. 13 is a simplified schematic of the closed-loop air cleaning system of the semiautomatic food frying apparatus according to the present invention.

In another embodiment of the semiautomatic food frying apparatus 10, filter means 70 and fan assembly 66 are removed and air inlet opening 30 and air outlet opening 54 are closed. A closed-loop air cleaning system 286 is provided to be used in conjuction with apertures 75 and 77. With reference to FIG. 13, the concept is disclosed. The closed-loop air cleaning system 286 comprises an interior or inside housing 288 having an inlet means 290 connected to a first blower means 292 whose exit opening is connected to the lower portion of interior or inside housing 288 and whose upper portion is connected to outlet means 296. Inlet means 290 is configured and positioned to operatively interface with aperture 77 of cabinet 12. Outlet means 296 is configured and positioned to operatively interface with aperture 75 of cabinet 12. At the lower portion of interior or inside housing 288 is collector 298 with a drain means 300 formed therein. Drain means 300 is configured to allow a container 301 to mount thereon. The hot internal air in cabinet 12 is circulated from cabinet 12 through the interior or inside housing 288 and back to cabinet 12 by first blower means 292 and is not allowed to exit into the room where cabinet 12 is located. An exterior or outside housing 294 surrounds interior or inside housing 288 except on the bottom surface or area where exterior or outside housing 294 is open. Exterior or outside housing 294 includes inlet means 302 to a second blower means 304.

Figure 14:
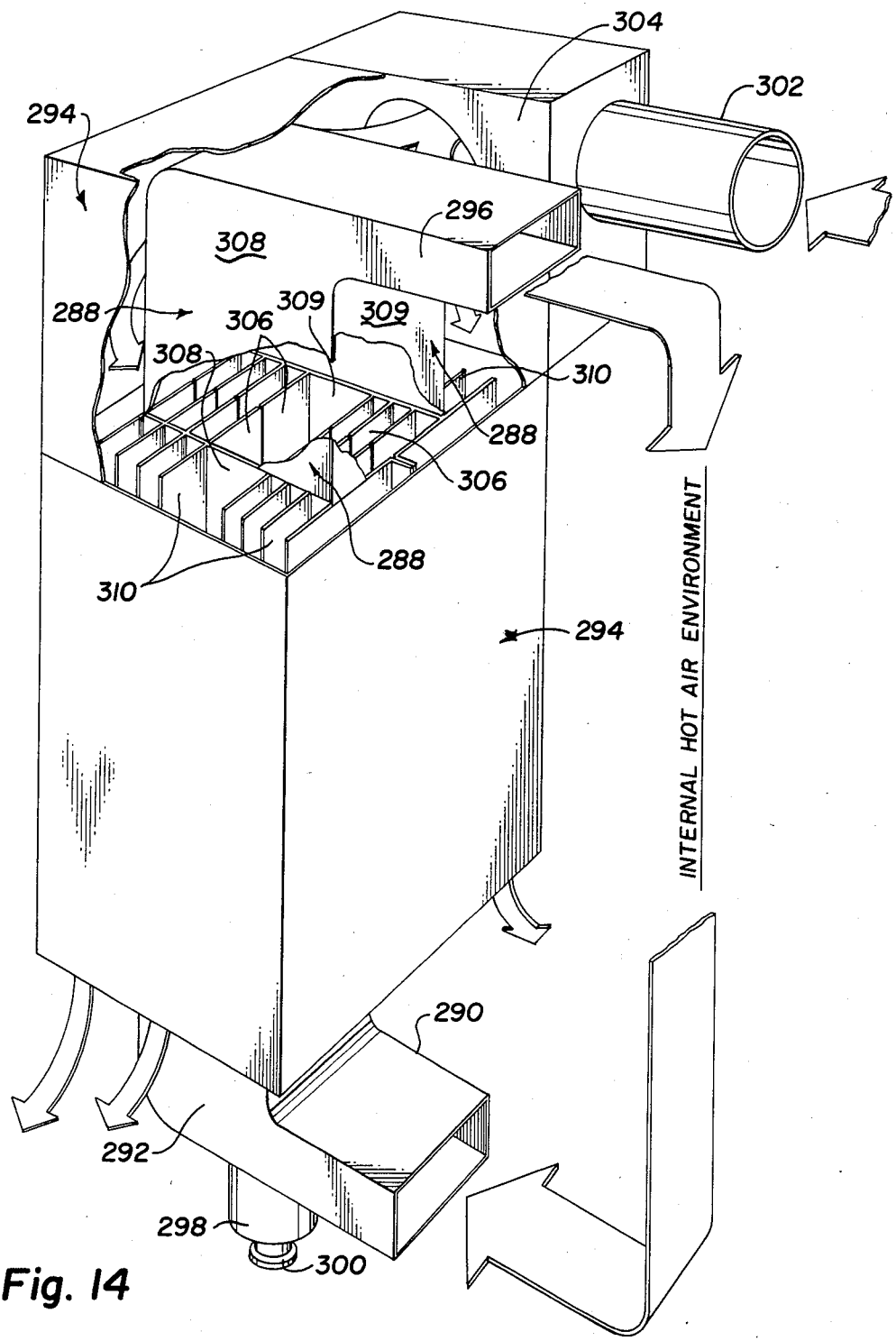
FIG. 14 is a simplified prespective view, partially in section, of the close-loop air cleaning system according to the present invention.

With reference to FIG. 14, further details of the closed-loop air cleaning system 286 are disclosed. The generally rectangular portion of interior or inside housing 288 includes cooling fins or protrusions 306 extending inwardly from the inside surface of walls 308 and 309 to increase the inside surface area of walls 308 and 309. Also included are cooling fins or protrusions 310 extending outwardly from the outside surface of walls 308 and 309 to increase the outside surface area of walls 308 and 309.

In operation of the closed-loop air cleaning system 286, first blower means 292 circulates the air from cabinet 12 through the interior or inside housing 288 and back to cabinet 12. This air includes smoke, water vapor given off by the food as it cooks, odors and oil vapor given off by the cooking oil 96. Second blower means 304 draws in the air-conditioned air from the bar or convenience store where the semiautomatic food frying apparatus 10 is located and passes that very cool air over cooling fins 310 and then the air exits the bottom of the exterior or outside housing 294. Cooling fins 306 and 310 are made from a material which has a high coefficient of thermal conductivity so that the very cool air passing over cooling fins 310 will cause cooling fins 306 to be much cooler than the hot air (from cabinet 12) which is passing over cooling fins 306. This results in the water and oil particles being condensed out of the water and oil vapor. Also, when the smoke and vapors strike the interior surfaces of the interior or inside housing 288 and the surfaces of cooling fins 306, the smoke and oil particles will be separated from the air stream. The water, smoke and oil particles will be deposited in collector 298 and/or container 301 due to gravity and the washing effect of the condensed water.

With reference to FIG. 15, the electrical portion of the embodiment of the semiautomatic food frying apparatus 10 with the closed-loop air cleaning system 286 is the same as that shown in FIG. 11 except motor 216 is removed. First blower means 292 and second blower means 304 are connected in parallel between terminals 215 and 217 so they will be energized whenever the semiautomatic food frying apparatus 10 is turned "on" by on/off switch 46.

Figure 16:
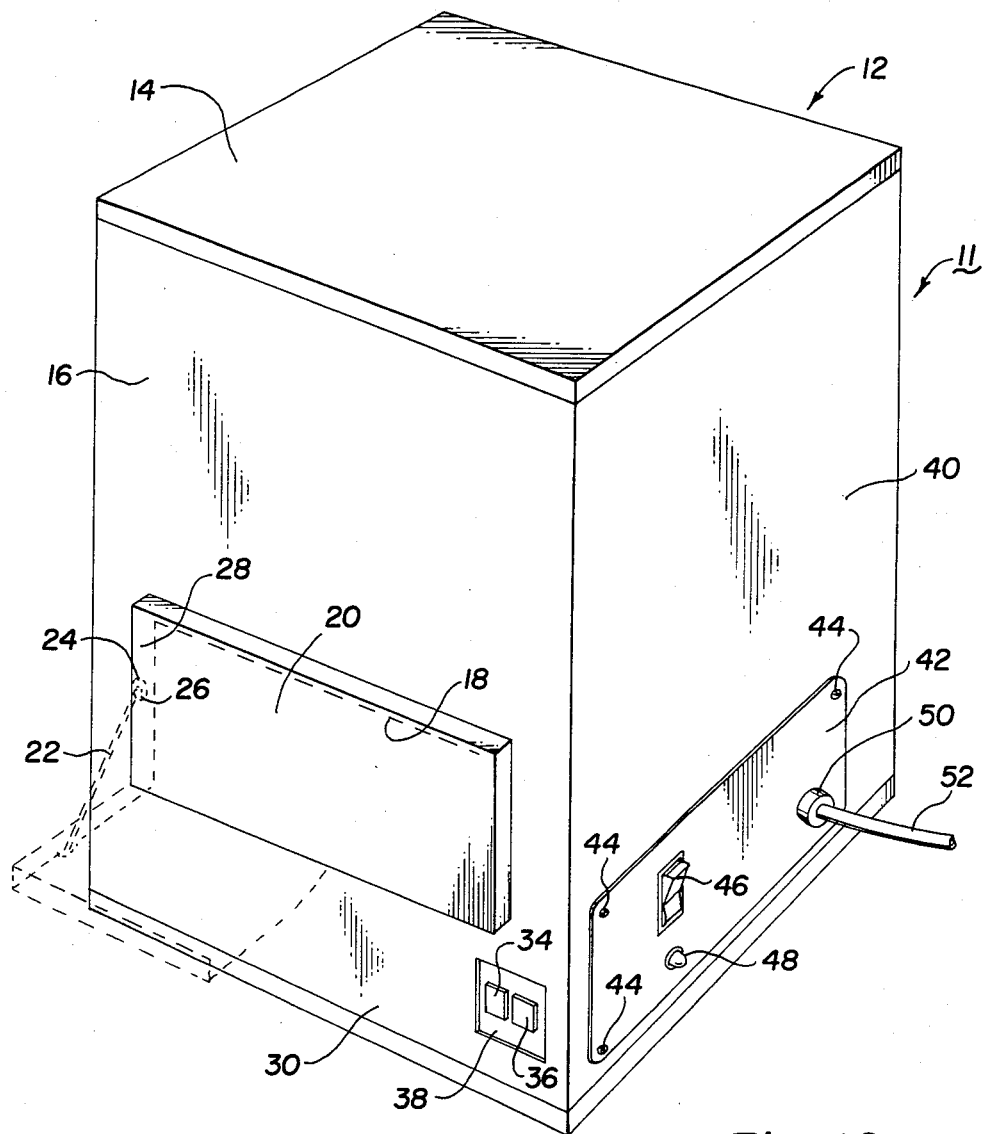
FIG. 16 is a simplified perspective view of a manual version of the food frying apparatus according to the present invention.
Figure 17:
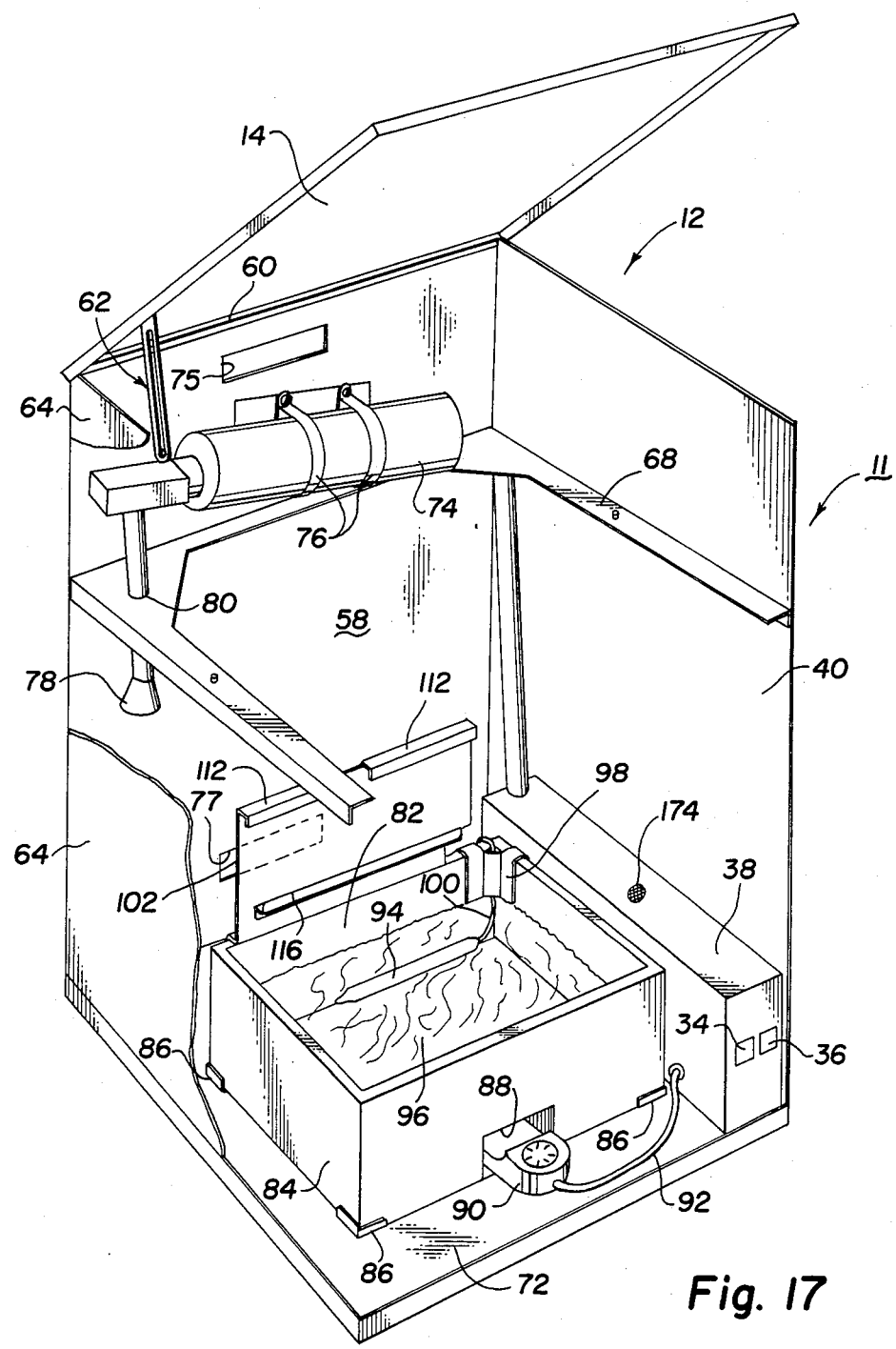
FIG. 17 is a simplified perspective view of the manual version of the food frying apparatus according to the present invention with portions of the cabinet being displaced to expose apparatus to view.

With reference to FIGS. 16 and 17 manual food frying apparatus 11 is shown. Since most of FIG. 16 is like FIG. 11 and most of FIG. 17 is like FIG. 2 and like elements have like reference numerals, only elements which have not been discussed with regard to FIGS. 1 and 2 will be discussed now in order to avoid repetition. Timer switch 49 and timer knob 51 are deleted, while timer switches 34 and 36 are added and positioned in one end of control box 38. The means for automatically lowering and raising the cooking basket 104 is deleted and included shaft 170, coupler 172, fastening means 174 and handle guides and holders 176. The operation of the manual embodiment is the same from turn-on by the employee up through the step when indicator light 168 is cycled off indicating the cooking oil had reached the desired temperature and that the apparatus 11 was ready to fry food. Then the operation would be as follows. The operator would place the food to be fried in the cooking basket 104 (either the small or the large double size), open tray or door 20, place the cooking basket 104 into the cooking oil 96 in container or vat 82. Then the operator would close tray or door 20 and push either time switch 34 or 36; timer switch 34 for the small basket and timer switch 36 for the large basket or for two small baskets. Timer switch 34 activates timer circuitry 182 for approximately two minutes while timer switch 36 activates timer circuitry 182 for approximately four minutes. These times are adjustable for different settings during manufacture. The front of each timer switch 34 and 36 will light when turned on. When the alloted time has passed, timer circuitry 182 causes buzzer 184 to sound for a predetermined time to alert the operator that it is time to remove the cooking basket 104 (containing the cooked food) from the cooking oil 96. The operator opens tray or door 20, removes the cooking basket 104 from the cooking oil 96 and places the cooking basket 104 on basket hanger or holder 102 for a short time to make certain all the cooking oil 96 has drained from the cooking basket 104 and the food contained therein. Then the operator removes the cooking basket 104, serves the food to the customer, places the cooking basket 104 back on basket hanger or holder 102 and closes tray or door 20 until more food needs to be cooked.

Figure 18:
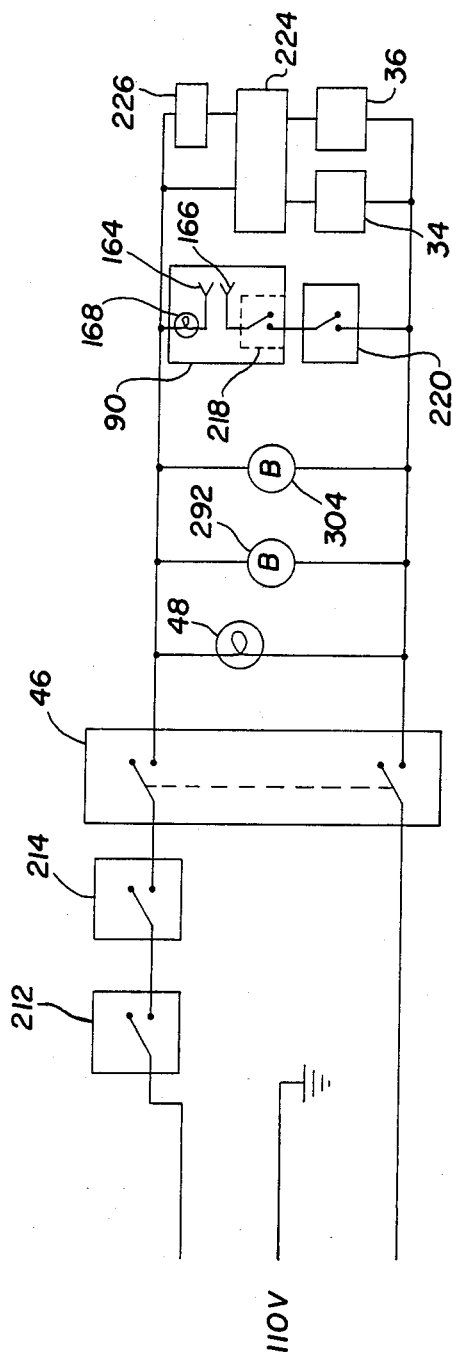
FIG. 18 is a simplified schematic diagram of the electrical power and safety elements of the manual version of the food frying apparatus according to the present invention.

With reference to FIG. 18, the electrical portion of the manual food frying apparatus with the closed-loop air cleaning system 286 incorporated is shown. FIG. 18 is very similar to FIGS. 11 and 15. The main difference being that timer switches 34 and 36 replace timer switch 49.

Thus it is apparent that there has been provided in accordance with this invention, three different embodiments of food frying apparatus which substantially incorporates the advantages set forth above. One embodiment is a semiautomatic food frying apparatus with a removable one-piece filter means. Another embodiment is a semiautomatic food frying apparatus with a closed-loop air cleaning system. Another embodiment is a manual food frying apparatus with a closed-loop air cleaning system. Although the present invention has been described in conjunction with specific forms thereof, it is evident that many alternatives, modifications, and variations will be apparent to those skilled in the art in light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc. may be made without departing from the spirit and scope of the invention as defined in the appended claims.

We claim:

1. Semiautomatic food frying apparatus adapted for use in an enclosed space without connection to an outside exhaust system, said apparatus comprising:

a cabinet adapted to be supported at a suitable working height and having a top panel, side panels, a rear panel and a front panel, at least one of said panels being configured to allow access to the interior of said cabinet;

a container located in said cabinet, for holding a supply of cooking oil;

means, integral with said container, for heating said container;

means for supporting food products in the cooking oil during the cooking of said food products, said means for supporting food products includes a handle means; and means to hold said means for supporting food products while automatically lowering said means for supporting food products into said supply of cooking oil for a predetermined time and then raising said means for supporting food products out of said supply of cooking oil, said means for supporting food products being held by said means to hold by using and resisting the forces of gravity and rotation applied to said means to hold through said means for supporting food products without the requirement for releasable latching means, said means to hold comprising:

(a) means to engage said handle means in a slidably-fitting relationship while supporting same, said means to engage comprises at least one U-shaped channel device configured to be capable of supporting said handle means along three separate surfaces, said means to engage further comprising stop means attached to a predetermined end of said U-shaped channel device to engage a fourth surface of said handle means, (b) rotatable means attached to said means to engage and capable of rotating in both directions within defined limits, (c) means to provide a rotatable force to said rotatable means, and (d) means to control the means to provide such that the rotatable force is controlled in amount of time of application as well as direction.

2. The apparatus of claim 1 wherein said rotatable means comprises a shaft of predetermined length and diameter.

3. The apparatus of claim 1 wherein said means to provide a rotatable force comprises a reversible DC motor operatively connected to said rotatable means.

4. The apparatus of claim 3 wherein said means to control comprises a timer switch operatively connected to an up limit-switch and a down limit-switch to control the application and polarity of a DC supply voltage to said reversible DC motor.

5. The apparatus of claim 1 further including blower means, located in said cabinet, for circulating air through said semiautomatic food frying apparatus along a predetermined path and exiting at a predetermined location;

a filter unit removably positionable, as a onepiece unit, in said predetermined air path and upstream from said blower means, said filter unit comprising two individual and separate elements with one element comprising paper and the second element comprising charcoal.

6. The apparatus of claim 5 wherein said filter unit comprises:

a solid bottom portion having a first side and a second side;

a paper housing element with opposed first and second open ends and having a predetermined inside diameter and a predetermined outside diameter, said paper housing element having said first open end resting against said first side of said solid bottom portion;

a housing element with opposed first and second open ends and having a predetermined inside diameter and a predetermined outside diameter, said predetermined outside diameter being smaller than said predetermined inside diameter of said paper housing element, said housing element including air passage means formed in the wall thereof, said housing element having said first open end thereof resting against said first side of said solid bottom portion, said housing element being positioned to be coaxial with said paper housing element;

a top portion having an aperture formed therein, said top portion being positioned such that said aperture is coaxial with said paper housing element and said housing element and supporting said second ends of said paper housing element and said housing element; and a predetermined amount of charcoal positioned in the volume formed by said solid bottom portion, said top portion, said paper housing element and said housing element.

7. The apparatus of claim 6 further including fastening means operatively positioned between said solid bottom portion and said top portion.

8. The apparatus of claim 6 wherein said charcoal is activated charcoal.

9. The apparatus of claim 5 wherein said filter unit is positioned to divide the interior of said cabinet into an upper portion and a lower portion.

10. The apparatus of claim 9 further including a fire extinguisher positioned in said upper portion, said fire extinguisher including a discharge head and a sensor positioned in said lower portion, said fire extinguisher including means for removing power to said food frying apparatus upon activation of said fire extinguisher.

11. The apparatus of claim 1 further including means for sensing the temperature of said container for holding a supply of cooking oil and for removing power from said means for heating said container if said temperature exceeds a predetermined value.

12. The apparatus of claim 1 further including means for sensing the temperature of said supply of cooking oil and for removing power from said means for heating said container for holding a supply of cooking oil if said temperature exceeds a predetermined value.

13. The apparatus of claim 1 further including means for the sensing the temperature of the air in a predetermined location within said cabinet and for removing power to said food frying apparatus if said temperature exceeds a predetermined value.

14. The apparatus of claim 1 wherein said front panel includes an opening therein, a door which is pivotably attached to said front panel at a lower edge of said opening, and support means operatively attached between said front panel and said door such that said door is supported in a horizontal position when said door is pivoted from a closed position with respect to said opening.

15. The apparatus of claim 1 further including insulative means juxtaposed with respect to predetermined portions of said container to diminish heat loss from said container.

16. The apparatus of claim 15 further including means for holding and supporting said means for supporting food products such that said means for supporting food products is positioned over said container for holding a supply of cooking oil and out of contact with said supply of cooking oil, said means for holding and supporting is supported by said insulative means.

17. The apparatus of claim 15 wherein said insulative means comprises a container-like device whose internal configuration is substantially the same as the external configuration of said container for holding a supply of cooking oil such that said container for holding a supply of cooking oil will sit down in said container-like device with the outside surface of said container for holding a supply of cooking oil being juxtaposed with respect to the inside surface of said container-like device.

18. The apparatus of claim 17 wherein said container-like device is formed of a high temperature plastic.

19. The apparatus of claim 17 wherein said container-like device is formed of stainless steel with double walls and insulation material positioned between said double walls.

20. Food frying apparatus for use in an enclosed space without connection to an outside exhaust system, said apparatus comprising:
   a cabinet adapted to be supported at a suitable working height and having a top panel, side panels, a rear panel and a front panel, at least one of said panels being configured to allow access to the interior of said cabinet;
   a container, located in said cabinet, for holding a supply of cooking oil;
   means, integral with said container, for heating said container;
   means for supporting food products in the cooking oil during the cooking of said food products, said means for supporting food products includes a handle means; and
   a closed-loop air cleaning system operatively attached to said cabinet and configured to receive air from the inside of said cabinet, to pass said received air through a predetermined portion of said closed-loop air cleaning system to remove water and predetermined impurities from said received air and then to deposit said received air, minus the removed water and impurities, back into the inside of said cabinet, said closed-loop air cleaning system comprises:
   (a) a first inlet means operatively attached to said cabinet to receive air exiting from the inside of said cabinet;
   (b) a first outlet means operatively attached to said cabinet to deposit said air, received from the inside of said cabinet, back into the inside of said cabinet;
   (c) a first housing means operatively connected between said inlet means and said outlet means to provide a complete air path from the inside of said cabinet, through a predetermined portion of said closed-loop air cleaning system and back to the inside of said cabinet;
   (d) a first blower means positioned in said complete air path to move the air at a predetermined rate;
   (e) a second housing means operatively configured and positioned to be in a surrounding relationship with a predetermined portion of said first housing means;
   (f) a second inlet means operatively attached to said second housing means to receive air from room containing said cabinet;
   (g) a second outlet means operatively configured to deposit air received from said second housing means back into said room;
   (h) a second blower means operatively positioned to move the air through said second housing means at a predetermined rate.

21. The apparatus of claim 20 further including cooling fins operatively attached to the inside surface of said first housing means and protruding inwardly therefrom.

22. The apparatus of claim 20 further including cooling fins operatively attached to the outside surface of said first housing means and protruding outwardly therefrom toward the inside surface of said second housing means.

23. The apparatus of claim 20 further including collection means operatively attached to a lowermost portion of said first housing means to collect said water and impurities from the air received from the inside of said cabinet.

24. The apparatus of claim 20 further including means to hold said means for supporting food products while automatically lowering said means for supporting food products into said supply of cooking oil for a predetermined time and then raising said means for supporting food products out of said supply of cooking oil, said means to hold comprising:
   (a) means to engage said handle means in a slidably-fitting relationship while supporting same,
   (b) rotatable means attached to said means to engage and capable of rotating in both directions within defined limits,
   (c) means to provide a rotatable force to said rotatable means, and
   (d) means to control the means to provide such that the rotatable force is controlled in amount of time of application as well as direction.

25. The apparatus of claim 24 wherein said means to engage comprises a U-shaped channel device configured to be capable of supporting said handle means along three separate surfaces, said means to engage further comprising stop means attached to a predetermined end of said U-shaped channel device to engage a fourth surface of said handle means.

26. The apparatus of claim 24 wherein said rotatable means comprises a shaft of predetermined length and diameter.

27. The apparatus of claim 24 wherein said means to provide a rotatable force comprises a reversible DC motor operatively connected to said rotatable means.

28. The apparatus of claim 27 wherein said means to control comprises a timer switch operatively connected to an up limit-switch and a down limit-switch to control the application and polarity of a DC supply voltage to said reversible DC motor.

29. The apparatus of claim 20 further including means for holding and supporting said means for supporting food products such that said means for supporting food products is positioned over said container for holding a supply of cooking oil and out of contact with said supply of cooking oil, said means for holding and supporting is supported by said insulative means.

30. The apparatus of claim 20 further including means for sensing the temperature of said container for holding a supply of cooking oil and for removing power from said means for heating said container if said temperature exceeds a predetermined value.

31. The apparatus of claim 20 further including means for sensing the temperature of said supply of cooking oil and for removing power from said means for heating said container for holding a supply of cooking oil if said temperature exceeds a predetermined value.

32. The apparatus of claim 20 further including means for the sensing the temperature of the air in a predetermined location within said cabinet and for removing power to said food frying apparatus if said temperature exceeds a predetermined value.

33. The apparatus of claim 20 wherein said front panel includes an opening therein, a door which is pivotably attached to said front panel at a lower edge of said opening, and support means operatively attached between said front panel and said door such that said door is supported in a horizontal position when said door is pivoted from a closed position with respect to said opening.

34. The apparatus of claim 20 wherein said insulative means comprises a container-like device whose internal configuration is substantially the same as the external configuration of said container for holding a supply of cooking oil such that said container for holding a supply of cooking oil will sit down in said container-like device with the outside surface of said container for holding a supply of cooking oil being juxtaposed with respect to the inside surface of said container-like device.

35. The apparatus of claim 34 wherein said container-like device is formed of a high temperature plastic.

36. The apparatus of claim 34 wherein said container-like device is formed of stainless steel with double walls and insulation material positioned between said double walls.

* * * * *